(12) United States Patent
Sugimoto

(10) Patent No.: US 6,659,558 B2
(45) Date of Patent: Dec. 9, 2003

(54) SEAT RECLINING DEVICE

(75) Inventor: Kunihisa Sugimoto, Shizuoka (JP)

(73) Assignee: Fuji Koko Co., Ltd., Kosai (JP)

( * ) Notice: Subject to any disclaimer, the term of this patent is extended or adjusted under 35 U.S.C. 154(b) by 0 days.

(21) Appl. No.: 10/123,209

(22) Filed: Apr. 17, 2002

(65) Prior Publication Data

US 2002/0153755 A1 Oct. 24, 2002

(30) Foreign Application Priority Data

Apr. 23, 2001 (JP) ........................................ 2001-123734

(51) Int. Cl.$^7$ ................................................ B60N 2/02
(52) U.S. Cl. .................... 297/367; 297/366; 297/368
(58) Field of Search ................................. 297/366, 367, 297/368, 378.1

(56) References Cited

U.S. PATENT DOCUMENTS

| 4,591,207 | A | * | 5/1986 | Nithammer et al. | ......... 297/366 |
|---|---|---|---|---|---|
| 4,629,252 | A | * | 12/1986 | Myers et al. | ............... 297/366 |
| 4,875,735 | A | * | 10/1989 | Moyer et al. | ............... 297/367 |
| 4,913,494 | A | * | 4/1990 | Ikegaya | ....................... 297/367 |
| 5,547,255 | A | * | 8/1996 | Ito et al. | ..................... 297/367 |
| 5,590,932 | A | * | 1/1997 | Olivieri | ....................... 297/367 |
| 5,718,481 | A | * | 2/1998 | Robinson | .................... 297/367 |
| 5,733,008 | A | * | 3/1998 | Tame | ..................... 297/378.11 |
| 5,749,625 | A | * | 5/1998 | Robinson | .................... 297/367 |
| 5,813,725 | A | * | 9/1998 | Robinson | .................... 297/367 |
| 5,934,753 | A | * | 8/1999 | Lange | ......................... 297/367 |
| 6,139,105 | A | * | 10/2000 | Morgos et al. | ......... 297/378.12 |
| 6,273,508 | B1 | * | 8/2001 | Lange | ................... 297/378.12 |

FOREIGN PATENT DOCUMENTS

| JP | 8-38286 | 2/1996 |
|---|---|---|
| JP | 8-38287 | 2/1996 |

* cited by examiner

*Primary Examiner*—Peter M. Cuomo
*Assistant Examiner*—Erika Garrett
(74) *Attorney, Agent, or Firm*—Foley & Lardner

(57) ABSTRACT

A seat reclining device has a base plate secured to a seat cushion, an arm member secured to a seat back, upper and lower tooth plates pivotally mounted on a base plate and provided with upper and lower teeth, a cam member pivotally mounted on the base plate, and at least one support for the lower tooth plate. When the cam member moves the lower tooth plate in a direction to bring the lower teeth into contact with the upper teeth, the upper tooth plate is locked together with the arm member so that the seat back becomes unable to pivot relative to the seat cushion. In such a locked condition, the support supports the end portion of the lower tooth plate so as to maintain the engagement of the upper and lower teeth. Thus, the seat reclining device can lock the seat back with improved strength.

27 Claims, 6 Drawing Sheets

SEAT RECLINING DEVICE

BACKGROUND OF THE INVENTION

The present invention relates to a seat reclining device and more specifically to an automotive seat reclining device capable of locking a seat back with improved strength.

An automotive seat is provided with a seat reclining device for locking a seat back at a desired angular position. The seat reclining device allows the seat back to pivot back and forth relative to a seat cushion when the angular position of the seat back is to be changed. At all other times, the seat back is held locked by the seat reclining device.

SUMMARY OF THE INVENTION

One type of seat reclining device employs toothed elements engageable with each other for locking the seat back.

The present invention is to provide a seat reclining device of such a type, which can lock a seat back with improved strength.

According to one aspect of the present invention, there is provided a seat reclining device, comprising: a base plate adapted to be secured to a seat cushion; a first toothed member adapted to be secured to a seat back and having first teeth; a center shaft with which the first toothed member is pivotally mounted on the base plate; a second toothed member having a pair of opposite first and second end portions and second teeth engageable with the first teeth, and pivotally mounted on the base plate at the first end portion thereof; a cam member pivotally mounted on the base plate so as to move the second toothed member in a direction to bring the second teeth into engagement with the first teeth for holding the seat back locked and in a direction to disengage the second teeth from the first teeth; a biasing member for biasing the cam member against the second toothed member in the direction to bring the second teeth into engagement with the first teeth; and a support for supporting the second end portion of the second toothed member so as to maintain engagement of the first teeth and the second teeth when the seat back is held locked.

According to another aspect of the present invention, there is provided a seat reclining device, comprising: a base plate adapted to be secured to a seat cushion; a first toothed member adapted to be secured to a seat back and having first teeth; a center shaft with which the first toothed member is pivotally mounted on the base plate; a second toothed member having a pair of opposite first and second end portions and second teeth engageable with the first teeth, and pivotally mounted on the base plate at the first end portion thereof; a cam member pivotally mounted on the base plate so as to move the second toothed member in a direction to bring the second teeth into engagement with the first teeth for holding the seat back locked and in a direction to disengage the second teeth from the first teeth; a spring member for urging the cam member to move the second toothed plate in the direction to bring the second teeth into engagement with the first teeth; and a control lever for controlling pivoting of the cam member, wherein at least one of the base plate and the cam member is provided with a support portion for supporting the second end portion of the second toothed member so as to maintain engagement of the first teeth and the second teeth when the seat back is held locked.

DESCRIPTION OF THE EMBODIMENT

Figure 1:
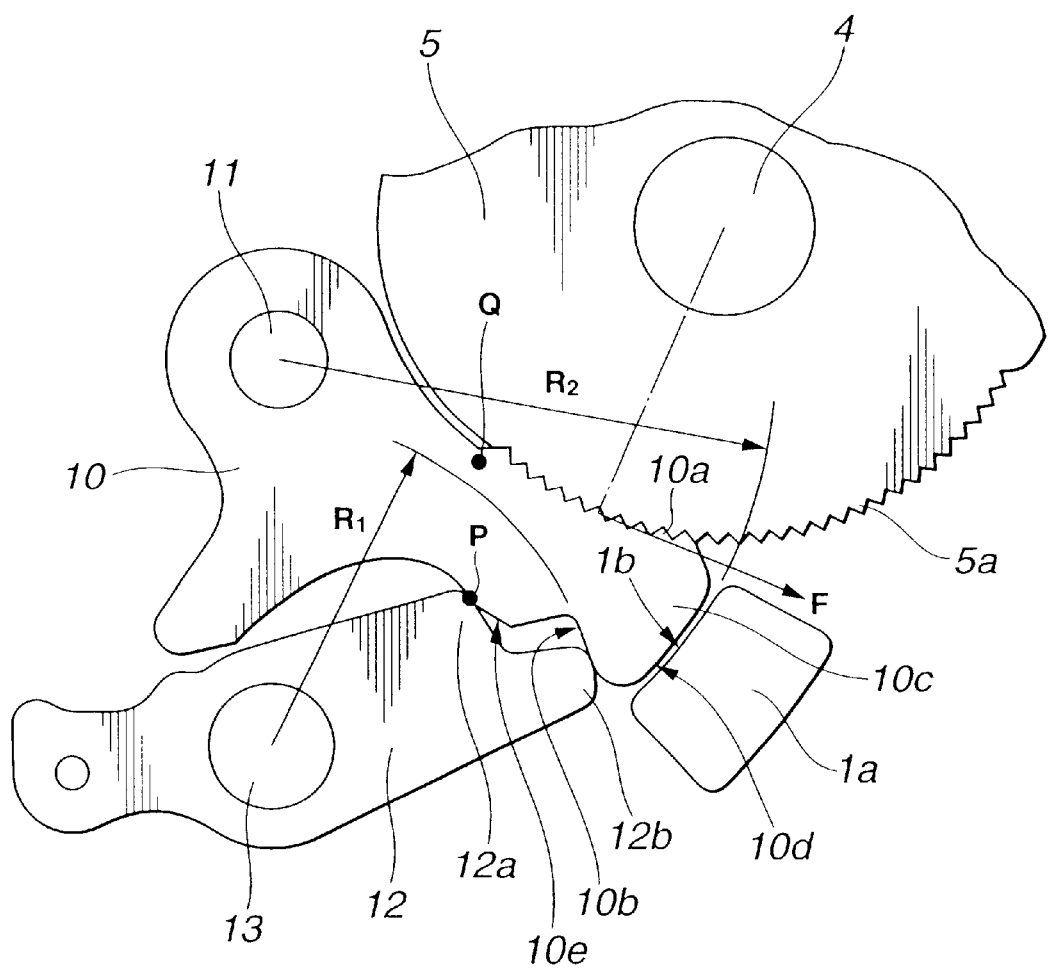
FIG. 1 is a schematic illustration showing a seat reclining device according to an embodiment of the present invention, when brought into a locked condition.

The present invention will be described with reference to the drawings, in which like parts and portions are designated by the same reference numerals in the drawings, thereby avoiding repeated descriptions.

Firstly, the principles of a seat reclining device will be described below with reference to Japanese Laid-Open Patent Publication Nos. 8-38286 and 8-38287 for convenience of understanding.

Figure 3:
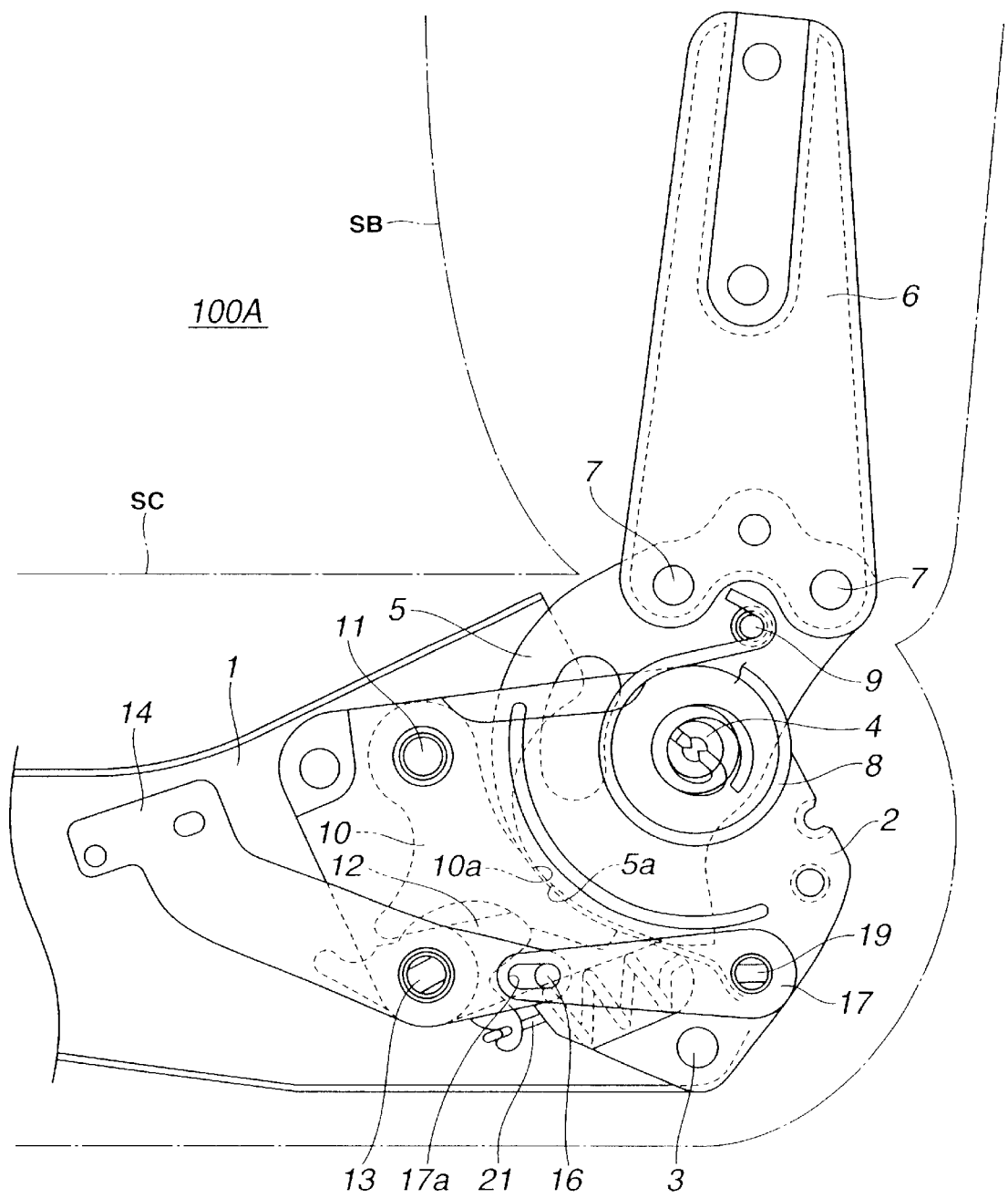
FIG. 3 is a side view of a driving part of a seat reclining device in which the present invention is to be embodied.
Figure 4:
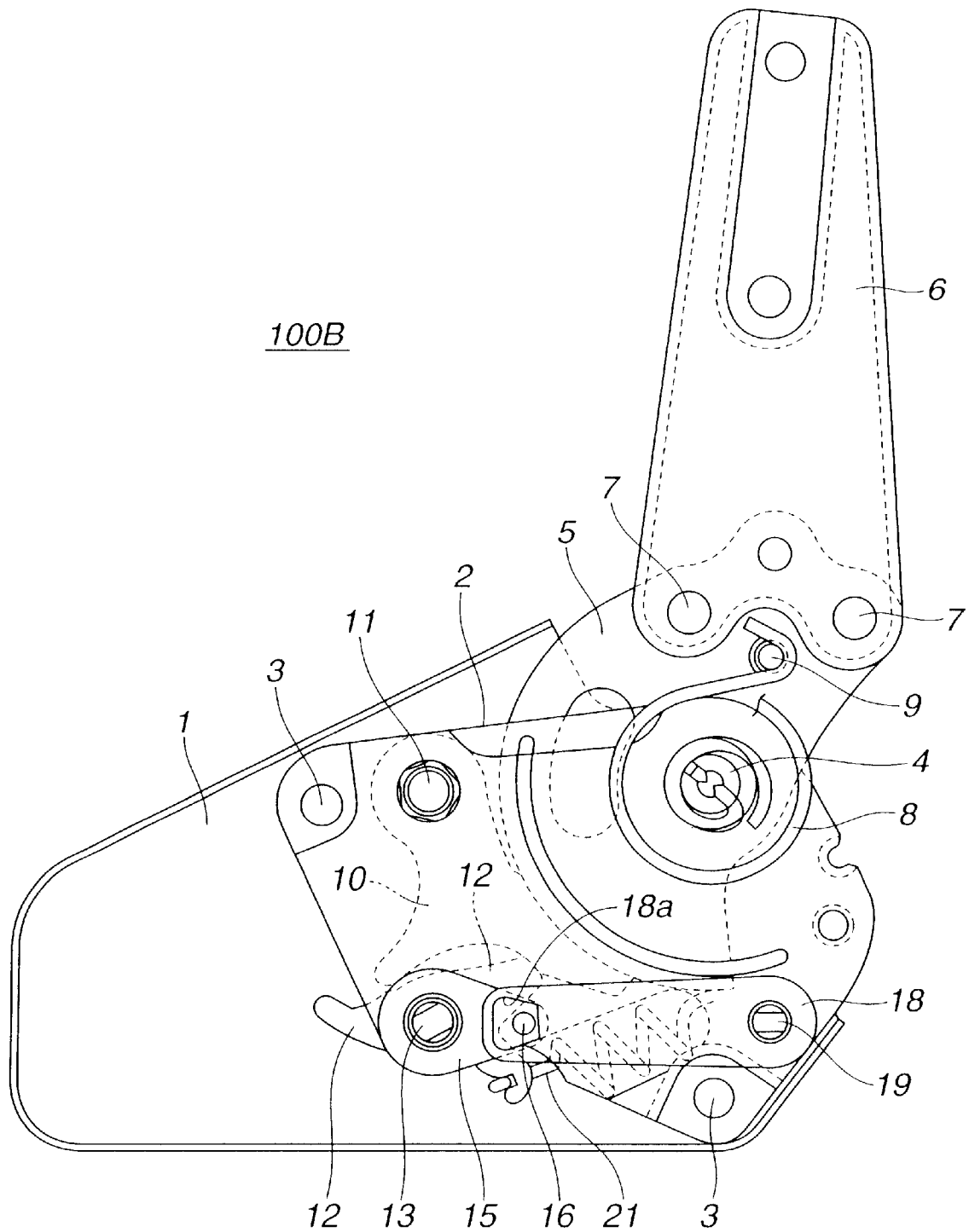
FIG. 4 is a side view of a driven part paired with the driving part of the seat reclining device of FIG. 3.
Figure 5:
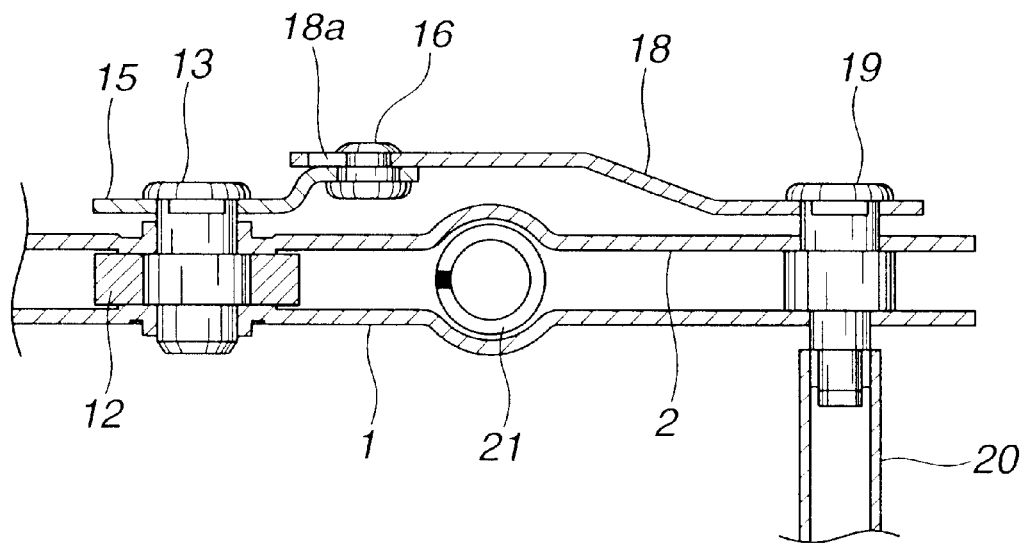
FIG. 5 is a sectional view of the driven part of the seat reclining device of FIG. 4.
Figure 6:
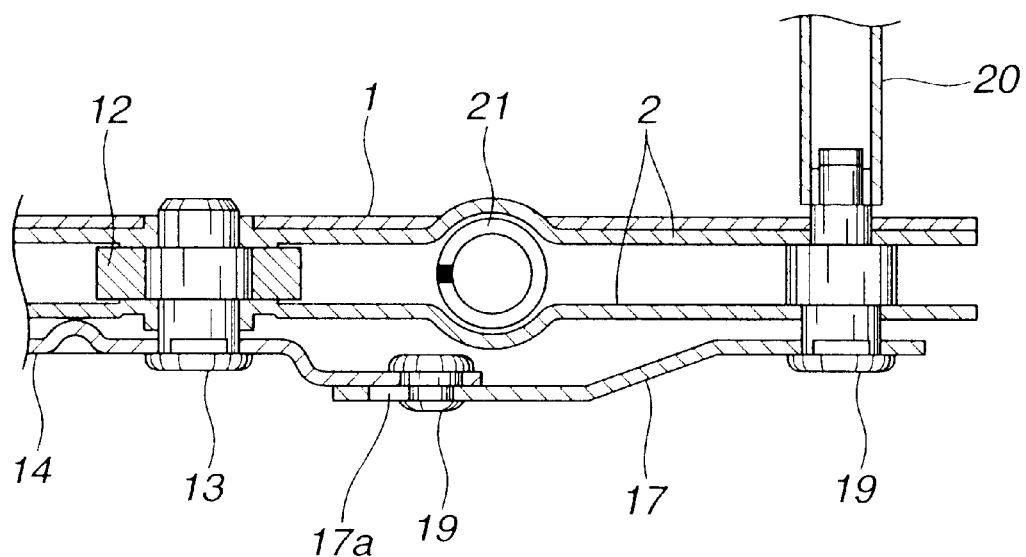
FIG. 6 is a sectional view of the driving part of the seat reclining device of FIG. 3.

A dual-type automotive seat reclining device includes a driving part 100A (shown in FIGS. 3 and 6) and a driven part 100B (shown in FIGS. 4 and 5) through which a seat back SB is pivotally attached to a seat cushion SC. The driving part 100A and the driven part 100B are connected to each other via a connection rod 20 so that the driven part 100B moves in synchronism with the driving part 100A.

The driving part 100A of the seat reclining device includes a base plate 1 adapted to be secured to the seat cushion SC, a pair of holder plates 2 attached to the base plate 1 by caulking with a pin 3, a center shaft 4 and shafts 11 and 13, an upper tooth plate 5 pivotally mounted on the base plate 1 through the center shaft 4, and an arm member 6 fixed to the upper tooth plate 5 by pins 7 and adapted to be secured to the seat back SB. The upper tooth plate 5 has an arc-shaped edge that is concentric with the center shaft 4, and is provided with upper teeth 5a formed in the edge. A pin 9 is formed on the upper tooth plate 5. Further, a spiral spring 8 is provided with its inner end engaged with the center shaft 4 and its outer end hooked to the pin 9. With the spiral spring 8, the upper tooth plate 5 is biased to tilt the arm member 6 toward the front of a car. The driving part 100A of the seat reclining device further includes a lower tooth plate 10 pivotally mounted on the base plate 1 through the shaft 11 and provided with lower teeth 10a engageable with the upper teeth 5a, a cam member 12 pivotally mounted through the cam shaft 13 and an operation lever 14 attached to a deformed end of the cam shaft 13 so as to move together with the cam member 12 as a single unit. A torsion spring 21 is provided having its one end hooked to the cam member 12 and the other end fixed to the holder plate 2. The cam member 12 is biased with the torsion spring 21 to pivot about the cam shaft 13 in a direction to press the lower tooth plate 10 against the upper tooth plate 5. Further, a pin 16 is formed on the operation lever 14 and loosely fitted in an elongated hole 17a of a link lever 17. The link lever 17 is connected to one deformed end of a shaft 19 fixed through the base plate 1 and the holder plates 2. The other deformed end of the shaft 19 is connected to the connection rod 20 so that the motion of the operation lever 14 is transmitted to actuate the driven part 100B.

The driven part 100B of the seat reclining device is similar (generally symmetrical) in structure to the driving part 100A, except that the driven part 100B has a base plate 1 shaped differently from that of the driving part 100A, a single base plate 2, an interlocked lever 15 in place of the operation lever 14, and a link lever 18 formed with an elongated hole 18a in place of the link lever 17. The elongated hole 18a is made larger than the elongated hole 17a, in order to compensate for variation in lock positions of the operation lever 14 and the interlocked lever 15.

When the operation lever 14 of the driving part 100A is pulled upwardly, the interlocked lever 15 of the driven part 100B is actuated via the link levers 17 and 18 and the connection rod 20. Then, in each of the driving and driven parts 100A and 100B, the cam member 12 pivots against the tension of the torsion spring 21 in the direction to release the lower tooth plate 10 from the upper tooth plate 5 so as to disengage the lower teeth 10a from the upper teeth 5a. The upper tooth plate 5 is thus unlocked. That is, the upper tooth plate 5 becomes able to pivot about the center shaft 4 under the spring tension of the return spring 8, thereby allowing the arm member 6 to pivot relative to the base plate 1.

After the arm members 6 of the driving and driven parts 100A and 100B are set to a desired angular position, the operation lever 14 is released. The interlocked lever 15 moves synchronically with the operation lever 14. In each of the driving and driven parts 100A and 100B, the cam member 12 is biased with the torsion spring 21 to pivot in the direction to press the lower tooth plate 10 against the upper tooth plate 5. The upper and lower teeth 5a and 10a are brought into engagement. The upper tooth plate 10 is thus held locked so as to prevent the arm member 6 from pivoting relative to the base plate 1.

Figure 7:
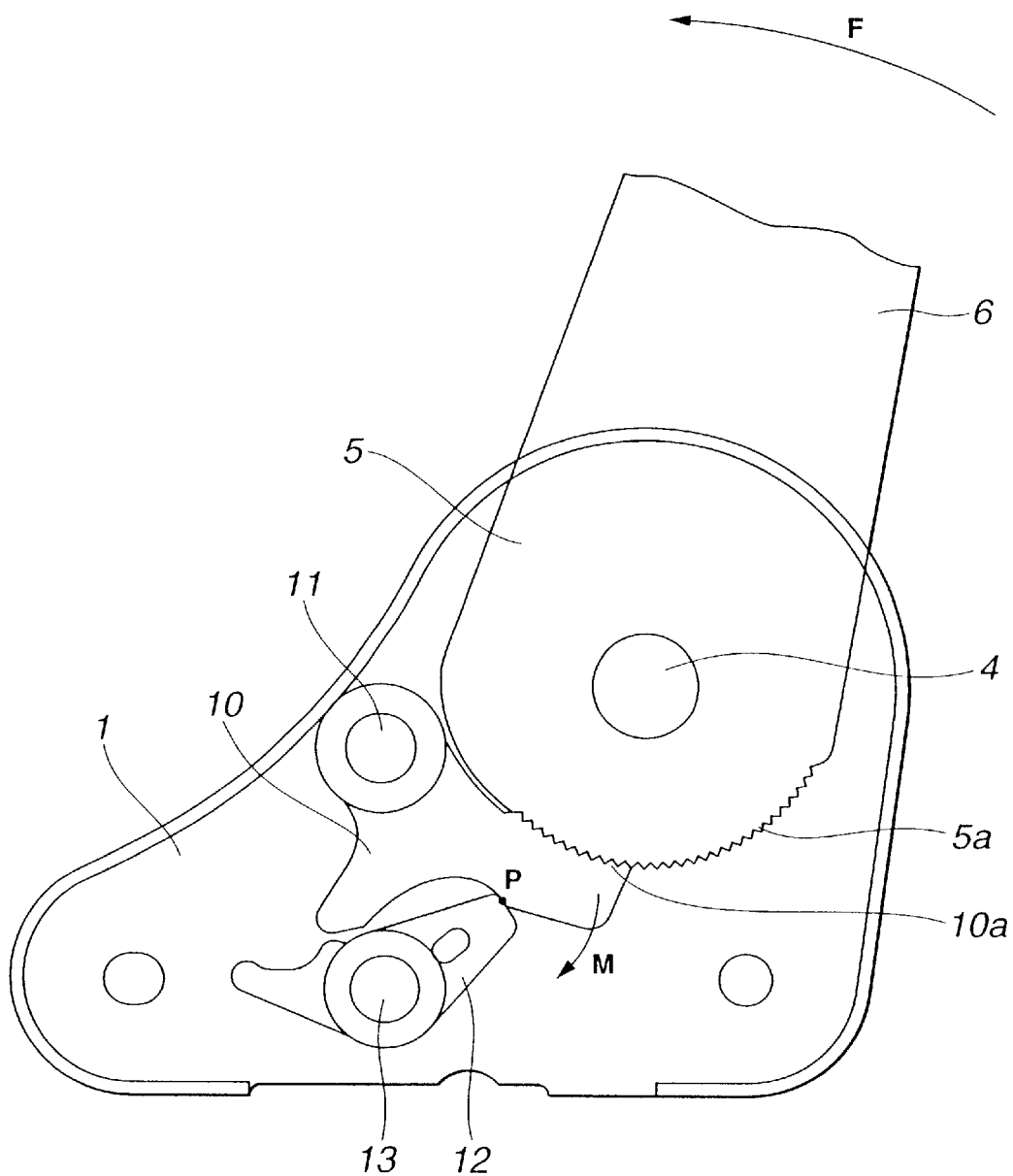
FIG. 7 is a schematic illustration showing the driving or driven part of the seat reclining device in a condition where it is put on head-on collision of a vehicle.

Under such a locked condition, the arm member 6 sustains a large forward force F as shown in FIG. 7 in the event of head-on collision. The lower tooth plate 10 is then acted upon by a momentum M centered on a contact point P between the lower tooth plate 10 and the cam member 12. There is a possibility that the lower tooth plate 10 becomes deformed owing to the momentum M so as to weaken the engagement of the teeth 5a and 10a, thereby failing to hold the arm member 6 locked together with the upper tooth plate 5. In order to prevent the possibility of such undesired deformation, the lower tooth plate 10 needs to be made of material having high tensile strength or be made with a large thickness.

In view of the foregoing, the present invention has been made to provide a seat reclining device capable of locking a seat back with improved strength, without necessitating the above-mentioned limitations on design of the tooth plate and the like.

An explanation will be given below of a seat reclining device according to an embodiment of the present invention with reference to FIGS. 1 and 2. Herein, the following embodiment of the invention is taken as an improved version of the above-described seat reclining device, thereby describing herein only improvements over the structure of the seat reclining device.

Figure 2:
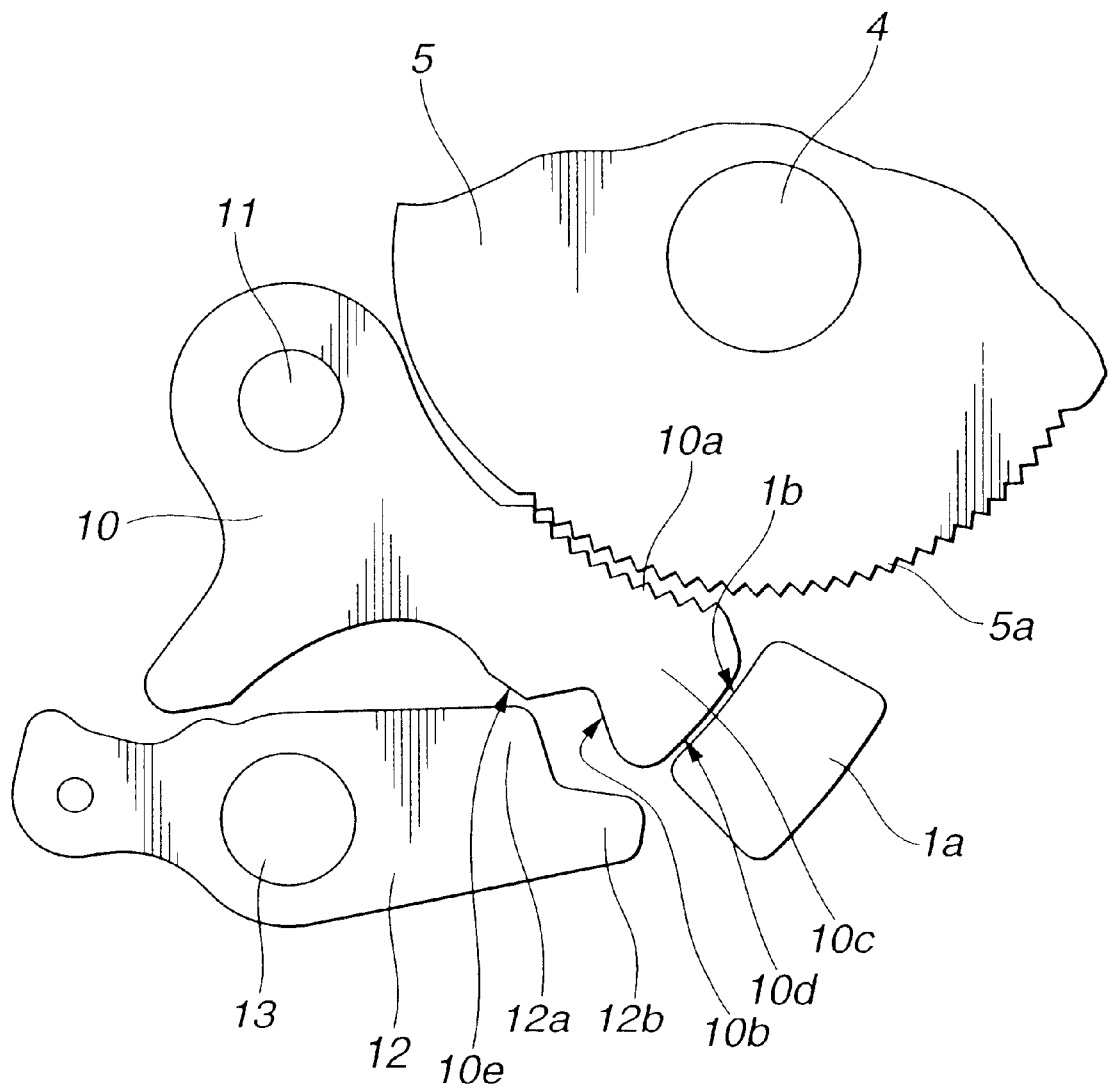
FIG. 2 is a schematic illustration showing the seat reclining device of FIG. 1, when brought into an unlocked condition.

That is, in each of the driving and driven parts 100A and 100B of the seat reclining device according to the present invention, at least one of first and second support portions 12b and 1a is provided for supporting an end portion 10C of the lower tooth plate 10 so as to secure the engagement of the teeth 5a and 10a, although both of them are illustrated in FIGS. 1 and 2.

The first support portion 12b is formed as a protrusion integral with an end portion of the cam member 12 and located further away from the cam shaft 13 than a cam portion 12a of the cam member 12. Correspondingly, the lower tooth plate 10 has a recessed portion 10b formed into an arc at a radius R1 of an axis of the shaft 13 so that the first support portion 12b is engaged in the recessed portion 10b with a little clearance therebetween, though not so shown in FIG. 1. The clearance between the first support portion 12b and the recessed portion 10b can be helpful to accommodate variations in part size, whereby the cam portion 12a can be brought in contact with a cam receiving surface 10e of the lower tooth plate 10 reliably for proper engagement of the upper and lower teeth 5a and 10a. Alternatively, the first support portion 12 and the recessed portion 10b may be formed so as to make sliding contact with each other.

Further, the second support portion 1a is formed by e.g. embossing on the base plate 1 and located on a line passing through the shaft 11 (i.e., the pivotal axis of the lower tooth plate 10) and the end portion 10c of the lower tooth plate 10. Alternatively, the second support portion 1a may be formed as one separate element and attached to the base plate 1. The second support portion 1a has a support surface 1b formed into an arc at a radius R2 of the shaft 11, so that the support surface 1b faces an end surface 10d with a little clearance therebetween.

In the above arrangement, when the operation lever 14 is pulled against the tension of the torsion spring 21, the cam member 12 moves in the direction to release the cam portion 12a from the cam receiving surface 10e in each of the driving and driven parts 100A and 100B. Accordingly, the lower tooth plate 10 pivots in the direction to disengage the lower teeth 10a from the upper teeth 5a. At this time, the second support portion 1a does not interfere with the pivoting of the lower tooth plate 10 because of the clearance between the second support portion 1a and the end portion 10c. The upper tooth plate 5 is thus unlocked, whereby the arm member 6 becomes free to pivot for adjustment of the angular position of the seat back SB.

On the other hand, when the operation lever 14 is released, the cam member 12 is biased with the torsion spring 21 so as to press the lower tooth plate 10 against the upper tooth plate 5 upon contact of the cam portion 12a and the cam receiving surface 103, thereby bringing the teeth 10a into contact with the teeth 10a, in each of the driving and driven parts 100A and 100B. The arm member 6 is thus locked together with the upper tooth plate 5. In such a locked condition, the first support portion 12b and the recessed portion 10b have a slight clearance therebetween, and the support surface 1b of the second support portion 1a and the end surface 10d of the end portion 10c have a slight clearance therebetween.

If the arm member 6 sustains a large forward force under the locked condition, the upper tooth plate 5 is urged to pivot, thereby exerting a force F on the engagement between the teeth 5a and 10a. Under the effect of the force F, the lower tooth plate 10 is acted upon by not only a force that pulls the lower tooth plate 10 in the direction of the force F but also a force that pushes the lower tooth plate 10 in a direction substantially perpendicular to the direction of the force F. As a result, the end portion 10c of the lower tooth plate 10 is subjected to a momentum centered around a contact point P between the lower tooth plate 10 and the cam member 12, and is therefore urged to become deformed. However, the first and second support portions 12b and 1a support the end portion 10c by contacting with the recess 10b and the end surface 10d, respectively, thereby preventing the end portion 10c from becoming deformed. It is therefore possible to avoid disengagement of the upper teeth 5a and the lower teeth 10a. Further, even when the force that pulls the lower tooth plate 10 in the direction of the force F concentrates on a portion W at the foot of the teeth 10a nearer to the shaft 11, the first and second support portions 12b and 1a support the lower tooth plate 10 and prevent the lower tooth plate 10 from being broken. Accordingly, the seat reclining device of the present invention can lock the seat back SB with improved strength by means of the driving and driven parts 100A and 100B thereof.

It is not necessary to provide both of the first and second support portions 12b and 1a as mentioned above. Even with either one of the first and second support portions 12b and 1a, the driving and driven parts 100A and 100B can lock the upper tooth plates 5 and the arm members 6 reliably, thereby holding the seat back SB locked with improved strength.

Although the present invention has been described with reference to a specific embodiment of the invention, the invention is not limited to the above-described embodiment. Various modification and variation of the embodiment described above will occur to those skilled in the art in light of the above teaching. The scope of the invention is defined with reference to the following claims.

What is claimed is:

1. A seat reclining device, comprising:
   a base plate adapted to be secured to a seat cushion;
   a first toothed member adapted to be secured to a seat back and having first teeth;
   a center shaft with which the first toothed member is pivotally mounted on the base plate;
   a second toothed member having a pair of opposite first and second end portions and second teeth engageable with the first teeth, and pivotally mounted on the base plate at the first end portion thereof;
   a cam member pivotally mounted on the base plate so as to move the second toothed member in a direction to bring the second teeth into engagement with the first teeth for holding the seat back locked and in a direction to disengage the second teeth from the first teeth the cam member having a cam portion brought into contact with a corresponding cam surface of the second toothed member for engagement of the first teeth and the second teeth;
   a biasing member for biasing the cam member against the second toothed member in the direction to bring the second teeth into engagement with the first teeth; and
   a support for supporting the second end portion of the second toothed member so as to maintain the engagement of the first teeth and the second teeth when the seat back is held locked, the support comprising a protrusion integral with the cam member to engageably face the second end portion of the second toothed member upon contact of the cam portion with the cam surface of the second toothed member.

2. A seat reclining device according to claim 1, wherein the cam surface of the second toothed member is located between the first and second end portions of the second toothed member, and the protrusion is located further away from a pivotal axis of the cam member that the cam portion.

3. A seat reclining device according to claim 2, wherein the protrusion faces the second end portion of the second toothed member with a clearance left between the protrusion and the second end portion of the second toothed member.

4. A seat reclining device according to claim 1, wherein the second toothed member has a recessed portion engageable with the protrusion.

5. A seat reclining device according to claim 4, wherein the recessed portion is formed into an arc with a center thereof coincident with a pivotal axis of the cam member.

6. A seat reclining device according to claim 1, wherein the support comprises a protruded portion mounted on the base plate and located on a line passing through the first and second end portions of the second toothed member.

7. A seat reclining device according to claim 6, wherein the protruded portion is formed on the base plate by embossing.

8. A seat reclining device according to claim 7, wherein the protruded portion has a support surface facing the second end portion of the second toothed member, and the support surface is formed into an arc with a center thereof coincident with a pivotal axis of the second toothed member.

9. A seat reclining device, comprising:
   a base plate adapted to be secured to a seat cushion;
   a first toothed member adapted to be secured to a seat back and having first teeth;
   a center shaft with which the first toothed member is pivotally mounted on the base plate;
   a second toothed member having a pair of opposite first and second end portions and second teeth engageable with the first teeth, and pivotally mounted on the base plate at the first end portion thereof;
   a cam member pivotally mounted on the base plate so as to move the second toothed member in a direction to bring the second teeth into engagement with the first teeth for holding the seat back locked and in a direction to disengage the second teeth from the first teeth, the cam member having a cam portion brought into contact with a corresponding cam surface of the second toothed member for engagement of the first and second teeth;
   a spring member for urging the cam member to move the second toothed member in the direction to bring the second teeth into engagement with the first teeth; and
   a control lever for controlling pivoting of the cam member, wherein the cam member has a support portion for supporting the second end portion of the second toothed member so as to maintain the engagement of the first teeth and the second teeth when the seat back is held locked, the support portion of the cam member being formed into a protrusion so as to engageably face the second end portion of the second toothed member upon contact of the cam portion with the cam surface of the second toothed member.

10. A seat reclining device according to claim 9, wherein the cam surface of the second toothed member is located between the first and second end portions of the second toothed member, and wherein the support portion of the cam member is a protrusion.

11. A seat reclining device according to claim 10, wherein the cam member has a cam portion for contact with a corresponding cam surface of the second toothed member, and the support portion of the cam member is located further away from a pivotal axis of the cam member than the cam portion.

12. A seat reclining device according to claim 9, wherein the second toothed member has a recessed portion engageable with the support portion of the cam member.

13. A seat reclining device according to claim 12, wherein the recessed portion is formed into an arc with a center thereof coincident with a pivotal axis of the cam member.

14. A seat reclining device according to claim 9, wherein the base plate has a support portion for supporting the second end portion of the second toothed member so as to maintain engagement of the first teeth and the second teeth when the seat back is held locked, the support portion of the base plate being formed into a protrusion and located on a line passing through the first and second end portions of the second teethed member.

15. A seat reclining device according to claim 14, wherein the support portion of the base plate is formed by embossing the base plate.

16. A seat reclining device according to claim 14, wherein the support portion of the base plate has a support surface facing the second end portion of the second toothed member, and the support surface is formed into an arc with a center thereof coincident with a pivotal axis of the second toothed member.

17. A seat reclining device according to claim 9, wherein the support portion of the cam member faces the second end portion of the second toothed member with a clearance between the support portion of the cam member and the second end portion of the second toothed member.

18. A seat reclining device, comprising:
a base plate adapted to be secured to a seat cushion;
a first toothed member adapted to be secured to a seat back and having first teeth;
a center shaft with which the first toothed member is pivotally mounted on the base plate;
a second toothed member having a pair of opposite first and second end portions and second teeth engageable with the first teeth, and pivotally mounted on the base plate at the first end portion thereof;
a cam member pivotally mounted on the base plate so as to move the second toothed member in a direction to bring the second teeth into engagement with the first teeth for holding the seat back locked and in a direction to disengage the second teeth from the first teeth;
a biasing member for biasing the cam member against the second toothed member in the direction to bring the second teeth into engagement with the first teeth; and
a support for supporting the second end portion of the second toothed member so as to maintain engagement of the first teeth and the second teeth when the seat back is held locked, the support comprising a protruded portion formed on the base plate by embossing and located on a line passing through the first and second end portions of the second toothed member.

19. A seat reclining device according to claim 18, wherein the protruded portion has a support surface facing the second end portion of the second toothed member, and the support surface is formed into an arc with a center thereof coincident with a pivotal axis of the second toothed member.

20. A seat reclining device according to claim 19, wherein the support surface faces the second end portion of the second toothed member with a clearance left between the support surface and the second end portion.

21. A seat reclining device, comprising:
a base plate adapted to be secured to a seat cushion;
a first toothed member adapted to be secured to a seat back and having first teeth;
a center shaft with which the first toothed member is pivotally mounted on the base plate;
a second toothed member having a pair of opposite first and second end portions and second teeth engageable with the first teeth, and pivotally mounted on the base plate at the first end portion thereof;
a cam member pivotally mounted on the base plate so as to move the second toothed member in a direction to bring the second teeth into engagement with the first teeth for holding the seat back locked and in a direction to disengage the second teeth from the first teeth;
a spring member for urging the cam member to move the second toothed member in the direction to bring the second teeth into engagement with the first teeth; and
a control lever for controlling pivoting of the cam member,
wherein the base plate has a support portion for supporting the second end portion of the second toothed member so as to maintain engagement of the first teeth and the second teeth when the seat back is held locked, the support portion being formed on the base plate by embossing to be in the form of a protrusion and located on a line passing through the first and second end portions of the second toothed member.

22. A seat reclining device according to claim 20, wherein the support portion of the base plate has a support surface facing the second end portion of the second toothed member, and the support surface is formed into an arc with a center thereof coincident with a pivotal axis of the second toothed member.

23. A seat reclining device according to claim 21, wherein the support surface faces the second end portion of the second toothed member with a clearance left between the support surface and the second end portion.

24. A seat reclining device, comprising:
a base plate adapted to be secured to a seat cushion;
a first toothed member adapted to be secured to a seat back and having first teeth;
a center shaft with which the first toothed member is pivotally mounted on the base plate;
a second toothed member having a pair of opposite first and second end portions and second teeth engageable with the first teeth, and pivotally mounted on the base plate at the first end portion thereof;
a cam member pivotally mounted on the base plate so as to move the second toothed member in a direction to bring the second teeth into engagement with the first teeth for holding the seat back locked and in a direction to disengage the second teeth from the first teeth;
a biasing member for biasing the cam member against the second toothed member in the direction to bring the second teeth into engagement with the first teeth; and
a support for supporting the second end portion of the second toothed member so as to maintain engagement of the first teeth and the second teeth when the seat back is held locked;
wherein the support comprises a protrusion integral with the cam member, and
wherein the second toothed member has a recessed portion engageable with the protrusion.

25. A seat reclining device, comprising:
a base plate adapted to be secured to a seat cushion;
a first toothed member adapted to be secured to a seat back and having first teeth;
a center shaft with which the first toothed member is pivotally mounted on the base plate;
a second toothed member having a pair of opposite first and second end portions and second teeth engageable with the first teeth, and pivotally mounted on the base plate at the first end portion thereof;
a cam member pivotally mounted on the base plate so as to move the second toothed member in a direction to bring the second teeth into engagement with the first teeth for holding the seat back locked and in a direction to disengage the second teeth from the first teeth;

a biasing member for biasing the cam member against the second toothed member in the direction to bring the second teeth into engagement with the first teeth; and a support for supporting the second end portion of the second toothed member so as to maintain engagement of the first teeth and the second teeth when the seat back is held locked, the support having a support surface facing the second end portion of the second toothed member, and the support surface is formed into an arc with a center thereof coincident with a pivotal axis of the second toothed member.

26. A seat reclining device, comprising:

a base plate adapted to be secured to a seat cushion;

a first toothed member adapted to be secured to a seat back and having first teeth;

a center shaft with which the first toothed member is pivotally mounted on the base plate;

a second toothed member having a pair of opposite first and second end portions and second teeth engageable with the first teeth, and pivotally mounted on the base plate at the first end portion thereof;

a cam member pivotally mounted on the base plate so as to move the second toothed member in a direction to bring the second teeth into engagement with the first teeth for holding the seat back locked and in a direction to disengage the second teeth from the first teeth;

a spring member for urging the cam member to move the second toothed member in the direction to bring the second teeth into engagement with the first teeth; and a control lever for controlling pivoting of the cam member, wherein at least one of the base plate and the cam member is provided with a support portion for supporting the second end portion of the second toothed member so as to maintain engagement of the first teeth and the second teeth when the seat back is held locked, wherein the support portion of the cam member is in the form of a protrusion, and wherein the second toothed member has a recessed portion engageable with the support portion of the cam member.

27. A seat reclining device, comprising:

a base plate adapted to be secured to a seat cushion;

a first toothed member adapted to be secured to a seat back and having first teeth;

a center shaft with which the first toothed member is pivotally mounted on the base plate;

a second toothed member having a pair of opposite first and second end portions and second teeth engageable with the first teeth, and pivotally mounted on the base plate at the first end portion thereof;

a cam member pivotally mounted on the base plate so as to move the second toothed member in a direction to bring the second teeth into engagement with the first teeth for holding the seat back locked and in a direction to disengage the second teeth from the first teeth;

a spring member for urging the cam member to move the second toothed member in the direction to bring the second teeth into engagement with the first teeth; and a control lever for controlling pivoting of the cam member, wherein at least one of the base plate and the cam member is provided with a support portion for supporting the second end portion of the second toothed member so as to maintain engagement of the first teeth and the second teeth when the seat back is held locked, wherein the support portion of the base plate has a support surface facing the second end portion of the second toothed member, and wherein the support surface is formed into an arc with a center thereof coincident with a pivotal axis of the second toothed member.

* * * * *